United States Patent
Balakrishnan et al.

(10) Patent No.: US 11,574,622 B2
(45) Date of Patent: Feb. 7, 2023

(54) JOINT AUTOMATIC SPEECH RECOGNITION AND TEXT TO SPEECH CONVERSION USING ADVERSARIAL NEURAL NETWORKS

(71) Applicant: Ford Global Technologies, LLC, Dearborn, MI (US)

(72) Inventors: Kaushik Balakrishnan, Cupertino, CA (US); Praveen Narayanan, San Jose, CA (US); Francois Charette, Tracy, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 111 days.

(21) Appl. No.: 16/919,315

(22) Filed: Jul. 2, 2020

(65) Prior Publication Data
US 2022/0005457 A1 Jan. 6, 2022

(51) Int. Cl.
*G10L 15/16* (2006.01)
*G10L 13/047* (2013.01)

(52) U.S. Cl.
CPC .......... *G10L 13/047* (2013.01); *G10L 15/16* (2013.01)

(58) Field of Classification Search
CPC ....... G10L 13/047; G10L 15/16; G10L 13/06; G10L 13/07; G10L 13/08; G10L 15/06;
(Continued)

(56) References Cited

U.S. PATENT DOCUMENTS 7,677,569 B2 3/2010 O'Hara
9,824,692 B1 * 11/2017 Khoury ................. G10L 17/18
(Continued)

FOREIGN PATENT DOCUMENTS

EP 3396601 A1 10/2018
EP 3557503 A1 10/2019

OTHER PUBLICATIONS

Baskar (Semi-supervised Sequence-to-sequence ASR using Unpaired Speech and Text, Cornell University, arXiv.org > eess > arXiv:1905.01152, 2019). (Year: 2019).*

(Continued)

*Primary Examiner* — Abdelali Serrou
(74) *Attorney, Agent, or Firm* — Brandon Hicks; Kilpatrick Townsend & Stockton LLP

(57) ABSTRACT

An end-to-end deep-learning-based system that can solve both ASR and TTS problems jointly using unpaired text and audio samples is disclosed herein. An adversarially-trained approach is used to generate a more robust independent TTS neural network and an ASR neural network that can be deployed individually or simultaneously. The process for training the neural networks includes generating an audio sample from a text sample using the TTS neural network, then feeding the generated audio sample into the ASR neural network to regenerate the text. The difference between the regenerated text and the original text is used as a first loss for training the neural networks. A similar process is used for an audio sample. The difference between the regenerated audio and the original audio is used as a second loss. Text and audio discriminators are similarly used on the output of the neural network to generate additional losses for training.

14 Claims, 10 Drawing Sheets

(58) Field of Classification Search
CPC .................. G10L 15/14; G10L 15/063; G10L 2015/0631; G10L 2015/0633; G10L 15/18; G10L 15/02; G10L 13/02; G10L 25/51; G10L 25/30; G10L 17/18; G10L 17/08; G10L 17/04; G10L 17/02; G10L 15/183; G10L 15/075; G10L 17/22; G10L 2015/025; G10L 25/18; G10L 15/07
See application file for complete search history.

(56) References Cited

U.S. PATENT DOCUMENTS

| | | | |
|---|---|---|---|
| 10,199,034 B2 | 2/2019 | Conkie et al. | |
| 10,210,861 B1* | 2/2019 | Arel | G06N 5/003 |
| 10,332,520 B2 | 6/2019 | Visser et al. | |
| 10,475,438 B1* | 11/2019 | Chicote | G10L 13/10 |
| 10,789,956 B1* | 9/2020 | Dube | G10L 15/26 |
| 11,138,964 B2* | 10/2021 | Ping | G10L 19/018 |
| 2002/0091528 A1 | 7/2002 | Daragosh et al. | |
| 2005/0038657 A1 | 2/2005 | Roth et al. | |
| 2019/0122651 A1* | 4/2019 | Arik | G10L 13/027 |
| 2019/0251952 A1 | 8/2019 | Arik et al. | |
| 2020/0043496 A1* | 2/2020 | Abdulkader | G06N 20/00 |
| 2020/0265832 A1* | 8/2020 | Payne | G10L 15/32 |
| 2020/0327884 A1* | 10/2020 | Bui | G10L 15/075 |
| 2021/0312906 A1* | 10/2021 | Kuo | G10L 15/1822 |
| 2021/0350786 A1* | 11/2021 | Chen | G10L 15/063 |
| 2021/0350795 A1* | 11/2021 | Kenter | G10L 15/02 |
| 2021/0366460 A1* | 11/2021 | Perucci | G10L 25/51 |

OTHER PUBLICATIONS

Schönherr, et al. "Adversarial Attacks Against Automatic Speech Recognition Systems via Psychoacoustic Hiding", Aug. 16, 2018, 18 pages.

Ma, et al. "Neural TTS Stylization with Adversarial and Collaborative Games", Published as a conference paper at ICLR 2019, 16 pages.

Sriram, et al. "Robust Speech Recognition Using Generative Adversarial Networks", Nov. 5, 2017, 5 pages.

Iter, et al. "Generating Adversarial Examples for Speech Recognition", published 2017, 8 pages.

Anonymous Authors, "TTS-GAN: A Generative Adversarial Network for Style Modeling in a Text-To-Speech System", Under review as a conference paper at ICLR 2019, Published 2018, 15 pages.

* cited by examiner

JOINT AUTOMATIC SPEECH RECOGNITION AND TEXT TO SPEECH CONVERSION USING ADVERSARIAL NEURAL NETWORKS

BACKGROUND

Two common and widely deployed technologies in computational linguistics are Automatic Speech Recognition (ASR) and Text-to-speech (TTS) conversion. However, there is not a common system for training and/or deploying both systems simultaneously. Current end-to-end deep learning-based ASR and TTS systems require paired (text and audio) samples, which are difficult to obtain in significant amounts for proper training of either system.

SUMMARY

In some embodiments, a solution to the above problems are disclosed herein using an end-to-end deep-learning-based system that can solve both ASR and TTS problems jointly using unpaired text and audio samples. The system includes an adversarially-trained approach to generate a more robust independent TTS neural network and an ASR neural network that can be deployed individually or simultaneously.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for training a text-to-speech (TTS) neural network and an automatic speech recognition (ASR) neural network. The method may include receiving a first text sample as input to the TTS neural network, and generating, using the TTS neural network, a first audio sample representing the first text sample. The first audio sample output by the TTS neural network may be fed into the ASR neural network, which may generate a second text sample representing the first audio sample. The loss based on the difference between the first text sample (fed into the TTS neural network) and the second text sample (output by the ASR neural network) is calculated. A second audio sample is input to the ASR neural network, and a third text sample representing the second audio sample is generated by the ASR neural network. The third text sample generated by the ASR neural network is input into the TTS neural network, which generates a third audio sample representing the third text sample. A second loss based on the difference between the second audio sample (input into the ASR neural network) and the third audio sample (output by the TTS neural network) is calculated. The TTS neural network and ASR neural network are trained by adjusting parameters of each neural network based on the calculated losses. Other embodiments of this aspect include corresponding computer systems, apparatus, and computer programs recorded on one or more computer storage devices, each configured to perform the actions of the methods.

Implementations may include one or more of the following features. In some embodiments, the TTS neural network includes a text encoder and an audio decoder, and training the TTS neural network includes adjusting one or more parameters of the text encoder or one or more parameters of the audio decoder. In some embodiments, the ASR neural network includes an audio encoder and a text decoder, and training the ASR neural network includes adjusting one or more parameters of the audio encoder or one or more parameters of the text decoder.

In some embodiments, the ASR neural network may generate a fourth text sample representing a fourth audio sample received as input to the ASR neural network. The fourth text sample output by the ASR and a fifth text sample from a textual source are provided to a text discriminator. The text discriminator may generate a third loss based on the fourth text sample and the fifth text sample. The ASR and/or TTS neural networks may be trained based at least in part on the third loss calculated by the text discriminator. In some embodiments, the text discriminator outputs a first value for a fake text sample (generated from an audio sample by the ASR neural network) and outputs a second value for a real text sample (generated from a textual source).

In some embodiments, the TTS neural network may generate a fourth audio sample representing a fourth text sample received as input to the TTS neural network. The fourth audio sample output by the TTS neural network and a fifth audio sample from an audio source are provided to an audio discriminator. The audio discriminator may generate a third loss based on the fourth audio sample and the fifth audio sample. The ASR and/or TTS neural networks may be trained based at least in part on the third loss. In some embodiments, the audio discriminator is trained to output a first value for a fake audio sample (generated from a text sample by the TTS neural network) and to output a second value for a real audio sample (generated from an audio source).

In some embodiments, the trained TTS neural network is deployed independently from the trained ASR neural network. In some embodiments, the trained TTS and ASR neural networks are deployed together to a single device. Implementations of the described techniques may include hardware, a method or process, or computer software on a computer-accessible medium.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

As discussed above, disclosed herein is a system and methods for jointly training a text-to-speech (TTS) system (e.g., neural network) and an automatic speech recognition (ASR) system (e.g., neural network). The system does not require paired text and audio samples for training, and the result is a robust ASR and TTS system that can be deployed jointly or separately. The process for training includes four cycles to train a total of 6 components (i.e., a text encoder, a text decoder, an audio encoder, an audio decoder, a text discriminator, and an audio discriminator). Using a generative adversarial network technique, the output from the ASR and the output from the TTS systems can be used as inputs to each other and discriminators to teach the ASR and TTS neural networks to perform robustly without the need for paired samples.

Figure 1:
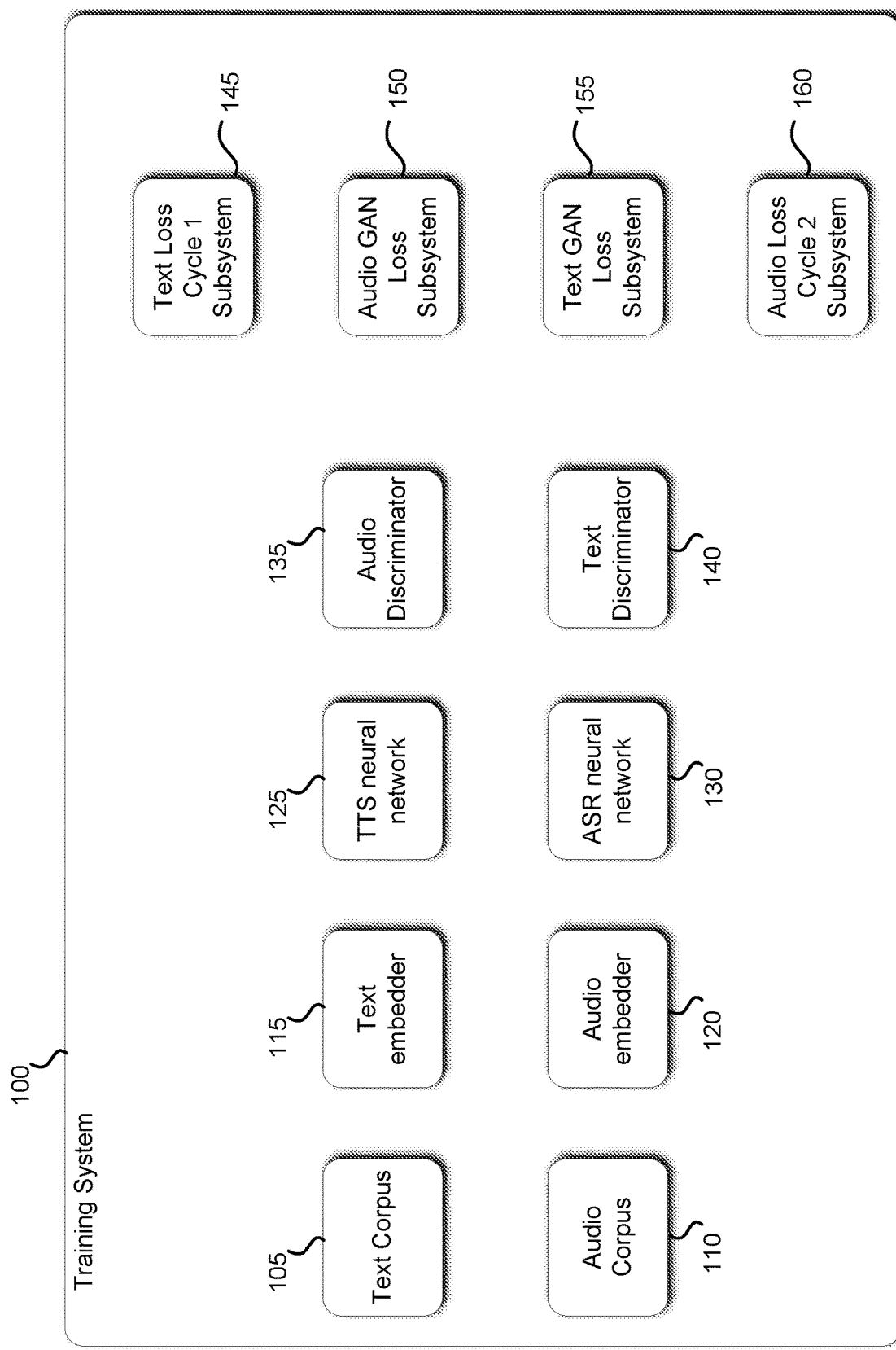
FIG. 1 illustrates a training system, according to some embodiments.

Turning now to FIG. 1, a training system 100 is depicted. The training system 100 includes a text corpus 105, an audio corpus 110, a text embedder 115, an audio embedder 120, a TTS neural network 125, an ASR neural network 130, an audio discriminator 135, a text discriminator 140, a text loss cycle 1 subsystem 145, an audio GAN loss subsystem 150, a text GAN loss subsystem 155, and an audio loss cycle 2 subsystem 160. While certain components are depicted and described within training system 100, more or fewer components may exist in training system 100 to perform operations such as, for example, processors and memory. These components are omitted for ease of description. Further, some components may be merged or separated into more components without departing from the scope of this disclosure.

The text corpus 105 includes samples of text taken from textual sources. For example, portions or entire books may be included, such as, for example, War and Peace by Leo Tolstoy and Angels and Demons by Dan Brown. The literary types of these samples may include all genres and writing types. Further, samples of text including postings on internet sites may be included and other modern textual communications may be included.

The audio corpus 110 includes samples of audio taken from audio sources. For example, portions or entire audio books may be included, such as, for example, Anna Karenina by Leo Tolstoy and Origins by Dan Brown. The audio samples may include musical samples, however spoken samples may be preferred.

Text embedder 115 receives a text sample and embeds the text sample into a known vector space such that the output of the text embedder 115 is a text embedding. The text embedding may be a vector representing the text sample in the known vector space, for example.

Audio embedder 120 receives an audio sample and embeds the audio sample into a known vector space such that the output of the audio embedder 120 is an audio embedding. The audio embedding may be a mel spectrogram representing the audio sample.

TTS neural network 125 is a text-to-speech network that receives a text embedding as input and outputs a decoded mel spectrogram representing the text embedding. The TTS neural network 125 includes a text encoder and an audio decoder as will be explained further with respect to FIG. 2.

ASR neural network 130 is an automatic speech recognition network (also known as an automatic voice recognition system) that receives an audio embedding (e.g., mel spectrogram) as input and outputs a decoded text embedding representing the audio embedding. The ASR neural network 130 includes an audio encoder and a text decoder as will be explained further with respect to FIG. 3.

The audio discriminator 135 is a discrimination system that takes mel spectrograms as input. It is trained to output a first value (e.g., "real," "1," or the like) for a mel spectrogram that was generated from an audio sample. The audio discriminator 135 is further trained to output a second value (e.g., "fake," "0," or the like) for a mel spectrogram that was generated from text via the TTS neural network 125.

The text discriminator 140 is a discrimination system that takes text embeddings as input. It is trained to output a first value (e.g., "real," "1," or the like) for a text embedding that was generated from a textual sample. The text discriminator 140 is further trained to output a second value (e.g., "fake," "0," or the like) for a text embedding that was generated from audio via the ASR neural network 130.

The text loss cycle 1 subsystem 145 is a first loss calculation subsystem that is used in the first training cycle. As described in more detail with respect to FIG. 4, the text loss cycle 1 subsystem 145 receives a text embedding from a text sample generated by the text embedder 115 as well as a text embedding that was generated from the text sample after passing the text sample through the text embedder 115, the TTS neural network 125, and the ASR neural network 130. The text loss cycle 1 subsystem 145 calculates the loss between the text embeddings and uses the result to train the components of the TTS neural network 125 and the ASR neural network 130. This process is described in more detail with respect to FIG. 4.

The audio loss cycle 2 subsystem 160 is a second loss calculation subsystem that is used in the second training cycle. As described in more detail with respect to FIG. 5, the audio loss cycle 2 subsystem 160 receives a mel spectrogram from an audio sample generated by the audio embedder 120 as well as a mel spectrogram that was generated from the audio sample after passing the audio sample through the audio embedder 120, the ASR neural network 130, and the TTS neural network 125. The audio loss cycle 2 subsystem 160 calculates the loss between the mel spectrograms and uses the result to train the components of the TTS neural network 125 and the ASR neural network 130. This process is described in more detail with respect to FIG. 5.

The text GAN loss subsystem 155 is a third loss calculation subsystem that is used in the third training cycle. As described in more detail with respect to FIG. 6, the text GAN loss subsystem 155 receives the output from the text discriminator 140 and the text embedding from the text embedder 115 that is the "real" text embedding. The text GAN loss subsystem 155 then uses the difference between the text discriminator 140 results and the text embedding to generate a loss used to train the text discriminator 140 and the ASR neural network 130 components.

The audio GAN loss subsystem 150 is a fourth loss calculation subsystem that is used in the fourth training cycle. As described in more detail with respect to FIG. 7, the audio GAN loss subsystem 150 receives the output from the audio discriminator 135 and the mel spectrogram from the audio embedder 120 that is the "real" mel spectrogram. The audio GAN loss subsystem 150 then uses the difference between the audio discriminator 135 results and the mel spectrogram to generate a loss used to train the audio discriminator 135 and the TTS neural network 125 components.

A more detailed description of how all the components of training system 100 are used together are provided in the descriptions of the following figures.

Figure 2:
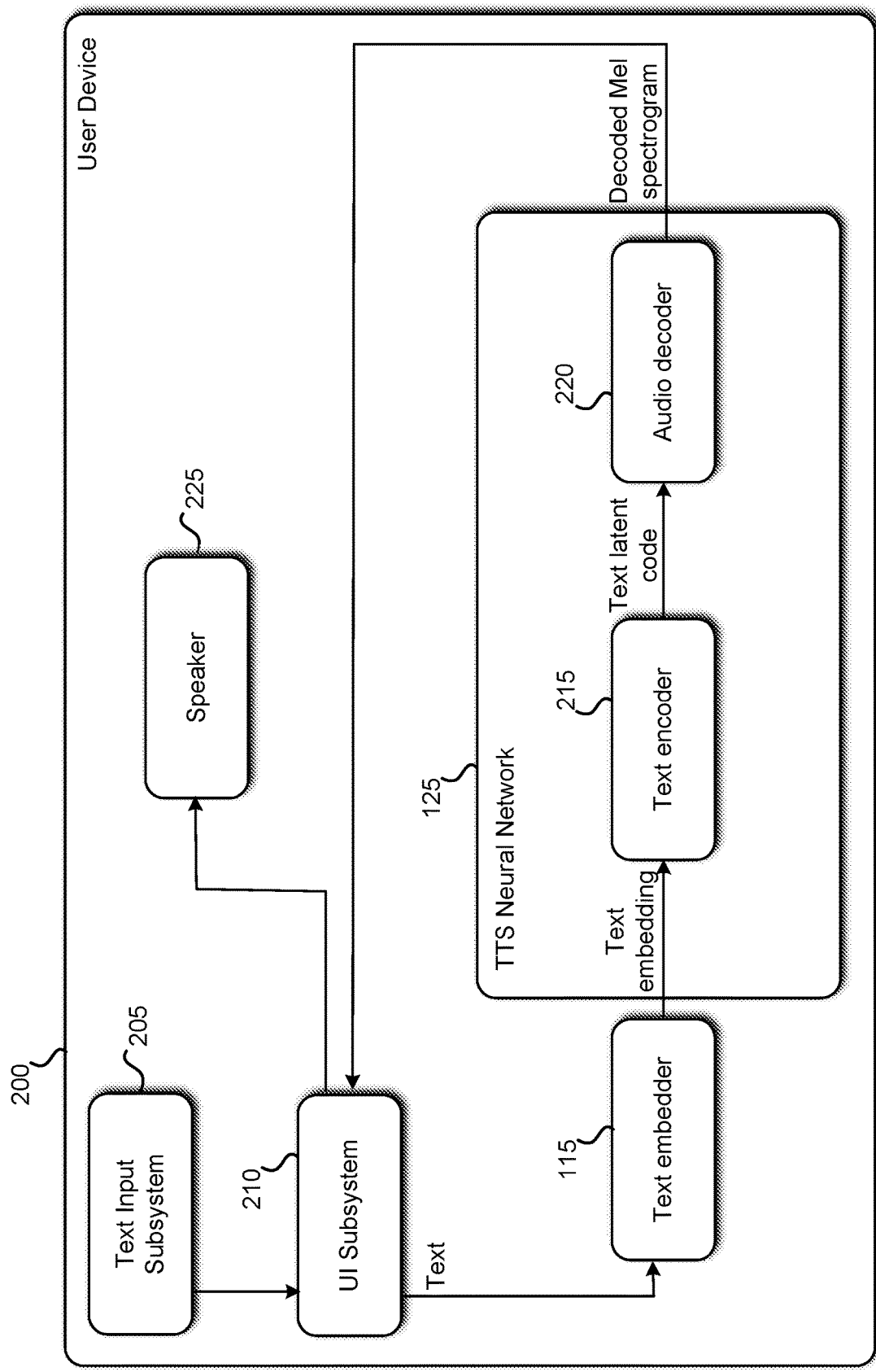
FIG. 2 illustrates a user device with a deployed TTS neural network, according to some embodiments.

FIG. 2 illustrates an example user device 200. The user device 200 may be a user's computer, smartphone, tablet, or the like. User device 200 may be computing device 900 as described with respect to FIG. 9. The user device 200 includes the TTS neural network 125 after training that has been deployed to provide text to speech functionality. The user device 200 includes a text input subsystem 205, a UI subsystem 210, a speaker 225, the text embedder 115, and the TTS neural network 125.

The text input subsystem 205 may be any input device including, for example, a keyboard, a screen-based keyboard, or the like. Additionally, the user may select text from a textual source to provide as input via the text input subsystem 205. The UI subsystem 210 provides an interface for the user to provide and receive information from the TTS neural network 125. The speaker 225 may be any suitable audio output device from which the user may hear sounds.

The TTS neural network 125 includes a text encoder 215 that takes a text embedding as input and outputs text latent code. The TTS neural network 125 further includes an audio decoder 220 that takes the text latent code as input and outputs a decoded mel spectrogram. While the two components of a text encoder 215 and audio decoder 220 are described within TTS neural network 125, the TTS neural network 125 may include many layers, including hidden layers, in which the text encoder 215 and audio decoder 220 are included. For example, TTS neural network 125 may include an input layer, an output layer, and one or more hidden layers. In the described configuration, the TTS neural network 125 receives a text embedding as input and outputs a decoded mel spectrogram representing the text embedding as output.

Accordingly, the user may enter text into the text input subsystem 205. The UI subsystem 210 may receive the text input and provide it to the text embedder 115. The text embedder 115 may generate a text embedding and provide the text embedding as input to the TTS neural network 125. The text encoder 215 generates text latent code from the text embedding, and the audio decoder 220 generates the decoded mel spectrogram from the text latent code. The decoded mel spectrogram is output to the UI subsystem 210, which turns the decoded mel spectrogram into an audio sample that can be output by the speaker 225 for the user to hear. In some embodiments, a conversion mechanism (not shown) converts the decoded mel spectrogram into an audio sample used by UI subsystem 210 to output using speaker 225.

Figure 3:
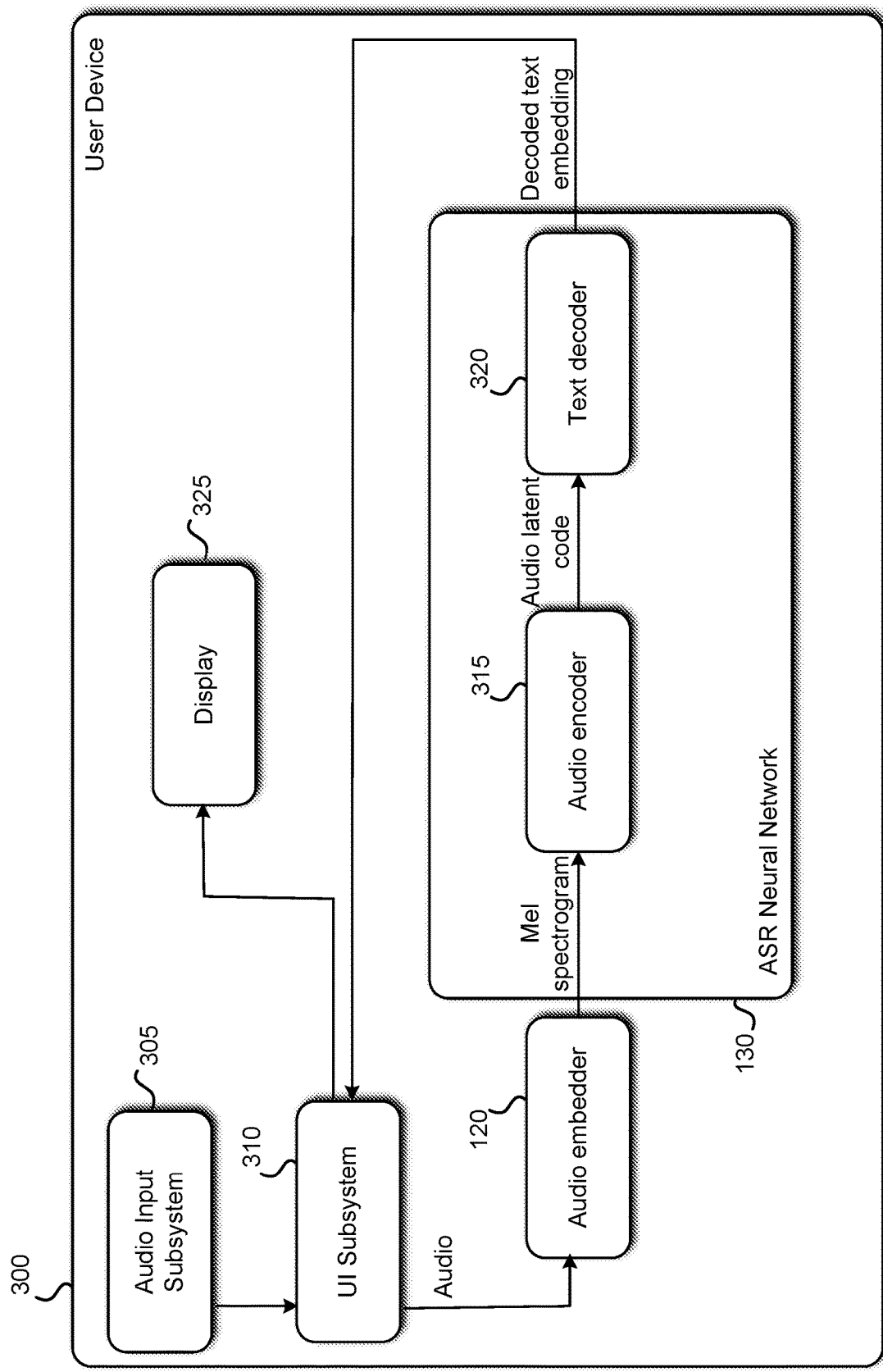
FIG. 3 illustrates a user device with a deployed ASR neural network, according to some embodiments.

FIG. 3 illustrates an example user device 300. The user device 300 may be the same as user device 200 in some examples, and the user device 200 or 300 may include both the ASR neural network 130 and the TTS neural network 125. The user device 300 may be a user's computer, smartphone, tablet, or the like. User device 300 may be computing device 900 as described with respect to FIG. 9. The user device 300 includes the ASR neural network 130 after training that has been deployed to provide automatic speech recognition functionality. The user device 300 includes an audio input subsystem 305, a UI subsystem 310, a display 325, the audio embedder 120, and the ASR neural network 130.

The audio input subsystem 305 may be any input device including, for example, a microphone, an audio selection system, or the like. For example, the user may select audio from an audio source to provide as input via the audio input subsystem 305. The UI subsystem 310 provides an interface for the user to provide and receive information from the ASR neural network 130. The display 325 may be any suitable textual output device on which the user may view text.

The ASR neural network 130 includes an audio encoder 315 that takes a mel spectrogram as input and outputs audio latent code. The ASR neural network 130 further includes a text decoder 320 that takes the audio latent code as input and outputs a decoded text embedding. While the two components of an audio encoder 315 and text decoder 320 are described within ASR neural network 130, the ASR neural network 130 may include many layers, including hidden layers, in which the audio encoder 315 and text decoder 320 are included. For example, ASR neural network 130 may include an input layer, an output layer, and one or more hidden layers. In the described configuration, the ASR neural network 130 receives a mel spectrogram as input and outputs a decoded text embedding representing the mel spectrogram as output.

Accordingly, the user may enter audio into the audio input subsystem 305. The UI subsystem 310 may receive the audio input and provide it to the audio embedder 120. The audio embedder 120 may generate a mel spectrogram and provide the mel spectrogram as input to the ASR neural network 130. The audio encoder 315 generates audio latent code from the mel spectrogram, and the text decoder 320 generates the decoded text embedding from the audio latent code. The decoded text embedding is output to the UI subsystem 310, which turns the decoded text embedding into a text sample that can be output by the display 325 for the user to view. In some embodiments, a conversion mechanism (not shown) is used to convert the text embedding into a text sample that is provided to the UI subsystem 310 for output by display 325.

While the ASR neural network 130 is shown deployed independently from the TTS neural network 125 in FIGS. 2 and 3, the ASR neural network 130 and TTS neural network 125 may be deployed onto a single device for use simultaneously to provide both TTS services and ASR services.

Figure 4:
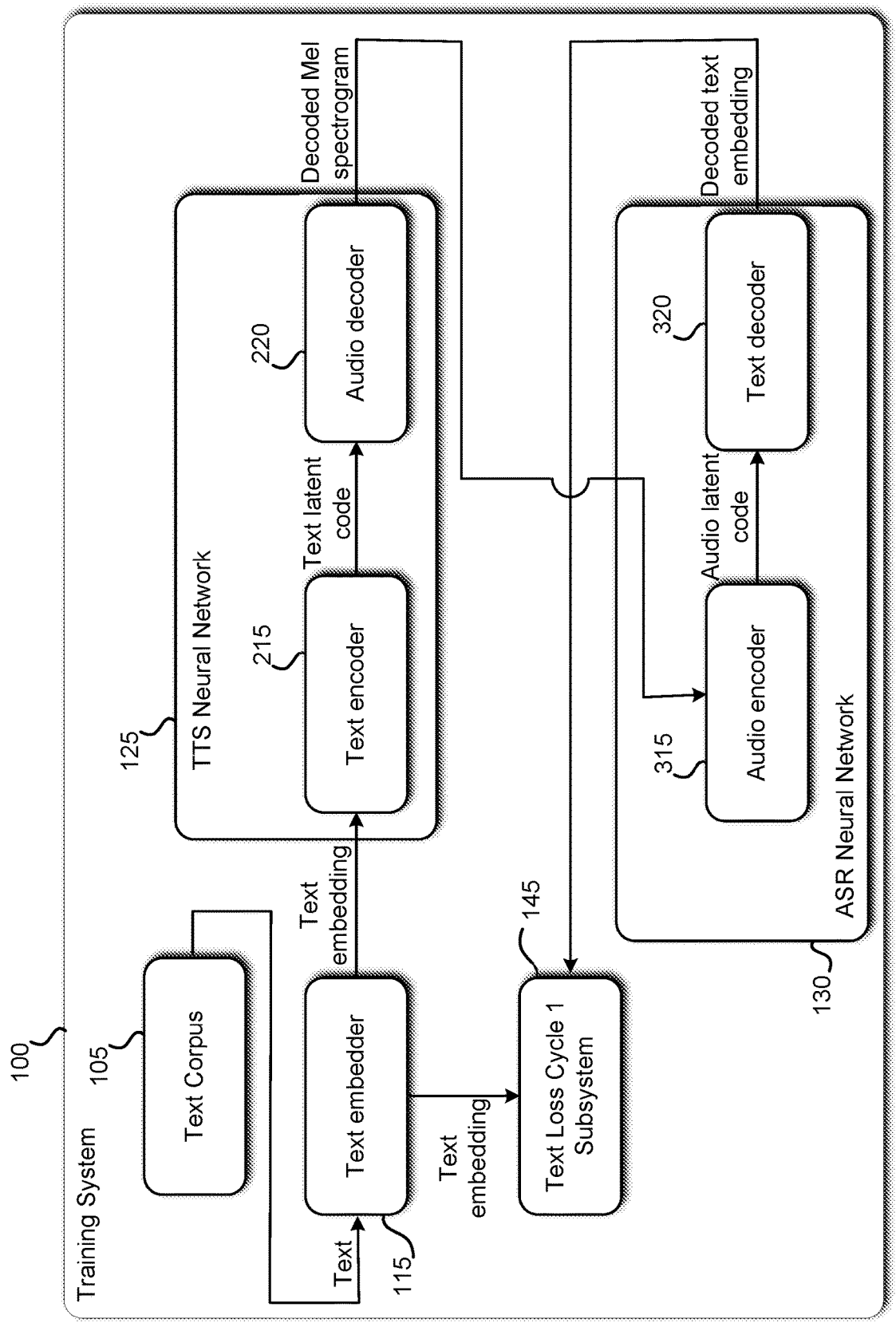
FIG. 4 illustrates the training system during a first cycle of training, according to some embodiments.

FIG. 4 illustrates the first cycle of the training of the TTS neural network 125 and the ASR neural network 130 in training system 100. A text sample is selected from the text corpus 105, and the text embedder 115 generates a text embedding representing the text sample. The text embedding is provided to the text loss cycle 1 subsystem 145 and to the TTS neural network 125.

The first portion of the first training cycle is to generate a decoded mel spectrogram representing the text embedding by the TTS neural network 125. The text encoder 215 generates text latent code from the text embedding, and the audio decoder 220 generates the decoded mel spectrogram from the text latent code.

The second portion of the first training cycle is to generate a decoded text embedding representing the decoded mel spectrogram by the ASR neural network 130. This is accomplished by feeding the output of the TTS neural network 125 into the input of the ASR neural network 130. Accordingly, the decoded mel spectrogram from the TTS neural network 125 is fed into the ASR neural network 130. The audio encoder 315 generates audio latent code from the decoded mel spectrogram, and the text decoder 320 generates a decoded text embedding from the audio latent code. The decoded text embedding is fed into the text loss cycle 1 subsystem 145.

The decoded text embedding generated by passing the text sample through the TTS neural network 125 and the ASR neural network 130 would match the text embedding from the text embedder 115 if the TTS neural network 125 and the ASR neural network 130 were functioning perfectly. However, the result is a bit like the "telephone game" of youth. After the same information is passed from one person to the next by whispering it in the ear of the next person in line, some of the details may be lost, and the end result may be a garbled non-sensical sentence. Accordingly, the text loss cycle 1 subsystem compares the decoded text embedding to the text embedding from text embedder 115 to generate a first cycle loss. This cycle may be performed many times during training. The first cycle loss may be:

$$L^{cycle1} = E[|X^{text} - P^{text}|]$$

In the equation above, $X^{text}$ is a sample from a textual source such as a text sample from the text corpus 105. $P^{text}$ is the output obtained after $X^{text}$ is processed through a full cycle of the system including the TTS neural network 125 and the ASR neural network 130.

Figure 5:
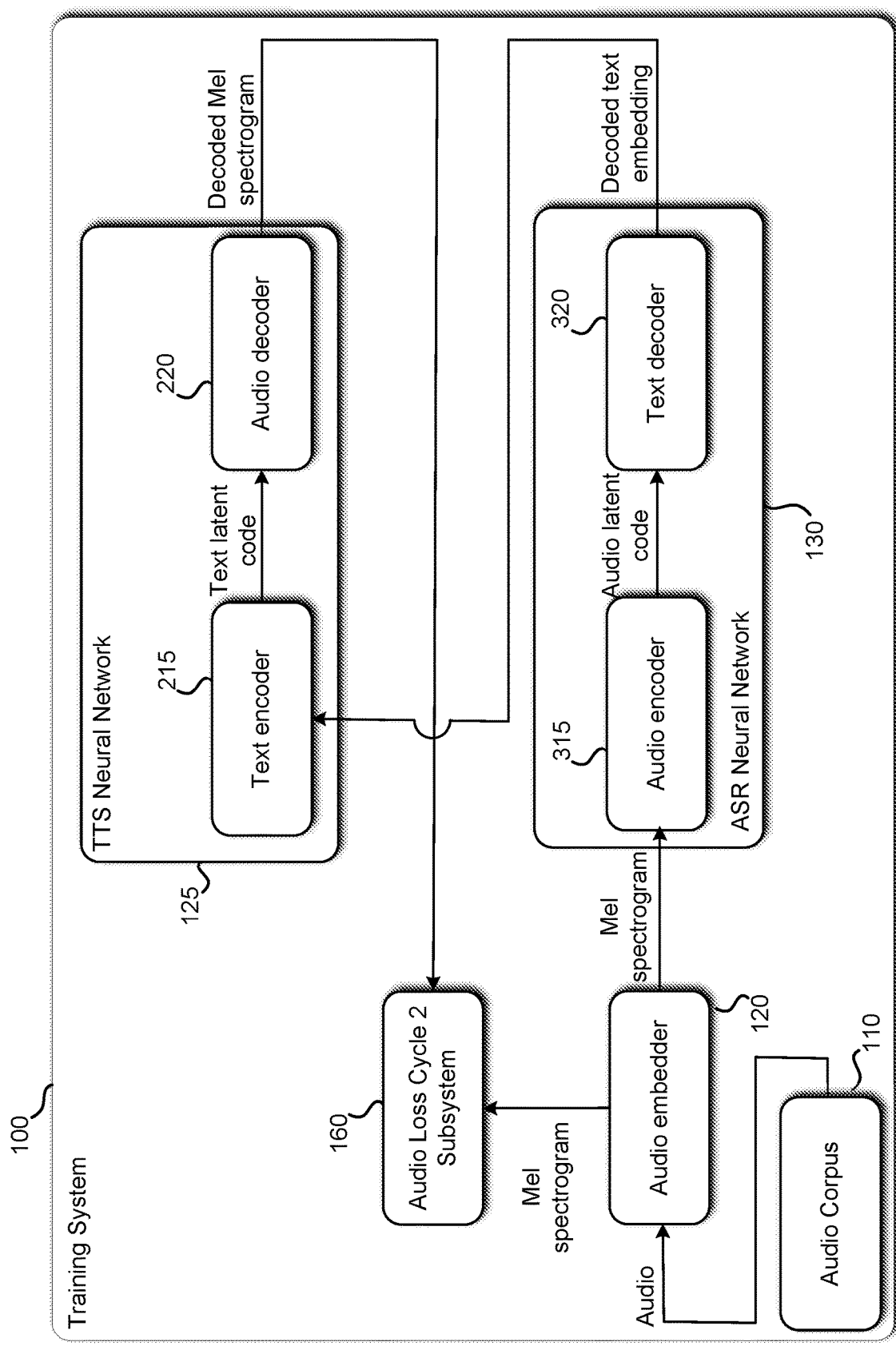
FIG. 5 illustrates the training system during a second cycle of training, according to some embodiments.

FIG. 5 illustrates the second cycle of the training of the TTS neural network 125 and the ASR neural network 130 in training system 100. The second cycle is much like the first cycle, but instead begins with an audio sample. An audio sample is selected from the audio corpus 110, and the audio embedder 120 generates a mel spectrogram representing the audio sample. The mel spectrogram is provided to the audio loss cycle 2 subsystem 160 and to the ASR neural network 130.

The first portion of the second training cycle is to generate a decoded text embedding representing the mel spectrogram by the ASR neural network 130. The audio encoder 315 generates audio latent code from the mel spectrogram, and the text decoder 320 generates the decoded text embedding from the audio latent code.

The second portion of the second training cycle is to generate a decoded mel spectrogram representing the decoded text embedding by the TTS neural network 125. This is accomplished by feeding the output of the ASR neural network 130 into the input of the TTS neural network 125. Accordingly, the decoded text embedding from the ASR neural network 130 is fed into the TTS neural network 125. The text encoder 215 generates text latent code from the decoded text embedding, and the audio decoder 220 generates a decoded mel spectrogram from the text latent code. The decoded mel spectrogram is fed into the audio loss cycle 2 subsystem 160.

The decoded mel spectrogram generated by passing the audio sample through the ASR neural network 130 and the TTS neural network 125 would match the mel spectrogram from the audio embedder 120 if the TTS neural network 125 and the ASR neural network 130 were functioning perfectly. However, as in cycle 1, the end result may be a garbled non-sensical sample. Accordingly, the audio loss cycle 2 subsystem 160 compares the decoded mel spectrogram to the mel spectrogram from audio embedder 120 to generate a second cycle loss. This cycle may also be performed many times during training. The second cycle loss may be:

$$L^{cycle2} = E[|X^{audio} - P^{audio}|]$$

In the equation above, $X^{audio}$ is a sample from an audio source such as an audio sample from the audio corpus 110. $P^{audio}$ is the output obtained after $X^{audio}$ is processed through a full cycle of the system including the ASR neural network 130 and the TTS neural network 125.

Figure 6:
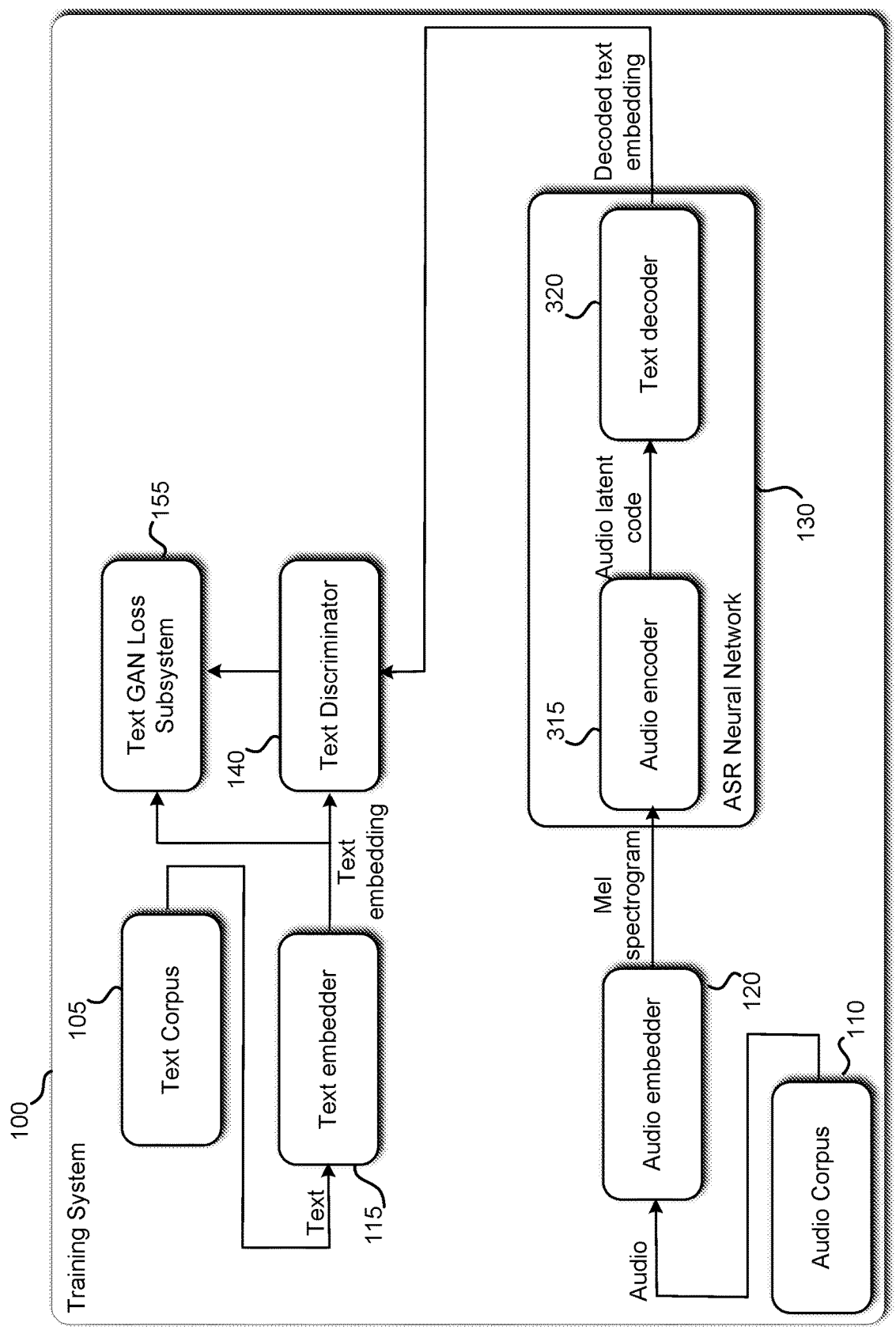
FIG. 6 illustrates the training system during a third cycle of training, according to some embodiments.

FIG. 6 illustrates the third cycle of the training of the TTS neural network 125 and the ASR neural network 130 in training system 100. In the third cycle, a text sample from the text corpus 105 and an audio sample from the audio corpus 110 are selected. The samples need not be related to each other.

The audio sample is provided to the audio embedder 120 to generate a mel spectrogram for input to the ASR neural network 130. The audio encoder 315 generates audio latent code representing the mel spectrogram, and the text decoder 320 generates the decoded text embedding from the audio latent code. The decoded text embedding is fed into the text discriminator 140.

The text sample from the text corpus 105 is provided to the text embedder 115. The text embedder 115 generates a text embedding and provides the text embedding to the text discriminator 140 and the text GAN loss subsystem 155.

The text discriminator 140 is trained to output a first value (e.g., "real," "1," or the like) for text embeddings that were generated from the text embedder 115 from a textual source. The text discriminator 140 is also trained to output a second value (e.g., "fake," "0," or the like) for decoded text embeddings generated by the ASR neural network 130. The text discriminator 140 generates an output value associated with the text embedding from text embedder 115 and for the decoded text embedding. The output values are provided to the text GAN loss subsystem 155.

The text GAN loss subsystem 155 uses the text embedding information from the text embedder 115 to determine which text embedding is "real" (i.e., from the text embedder 115) and which is "fake" (i.e., from the ASR neural network 130). The text GAN loss subsystem 155 can determine whether the text discriminator 140 made correct determinations. The calculated losses by the text GAN loss subsystem 155 can be used to train the text discriminator 140 and the ASR neural network 130.

The first loss for the text discriminator 140 is used to train the text discriminator 140. The first loss can be described as:

$$L^{Text\ Discriminator} = -E_{real}[\log D(X^{real\ text})] - E_{fake}[\log(1 - D(X^{fake\ text}))]$$

In the equation above, $X^{real\ text}$ is a sample from a textual source such as a text sample from the text corpus 105. $X^{fake}_{text}$ is the output obtained after an audio sample (e.g., from audio corpus 110) is processed through ASR neural network 130.

The second loss calculated by the text GAN loss subsystem 155 is used to train the ASR neural network 130. The second loss can be described as:

$$L^{Text\ Generator} = E_{fake}[\log(1 - D(X^{fake\ text}))]$$

Figure 7:
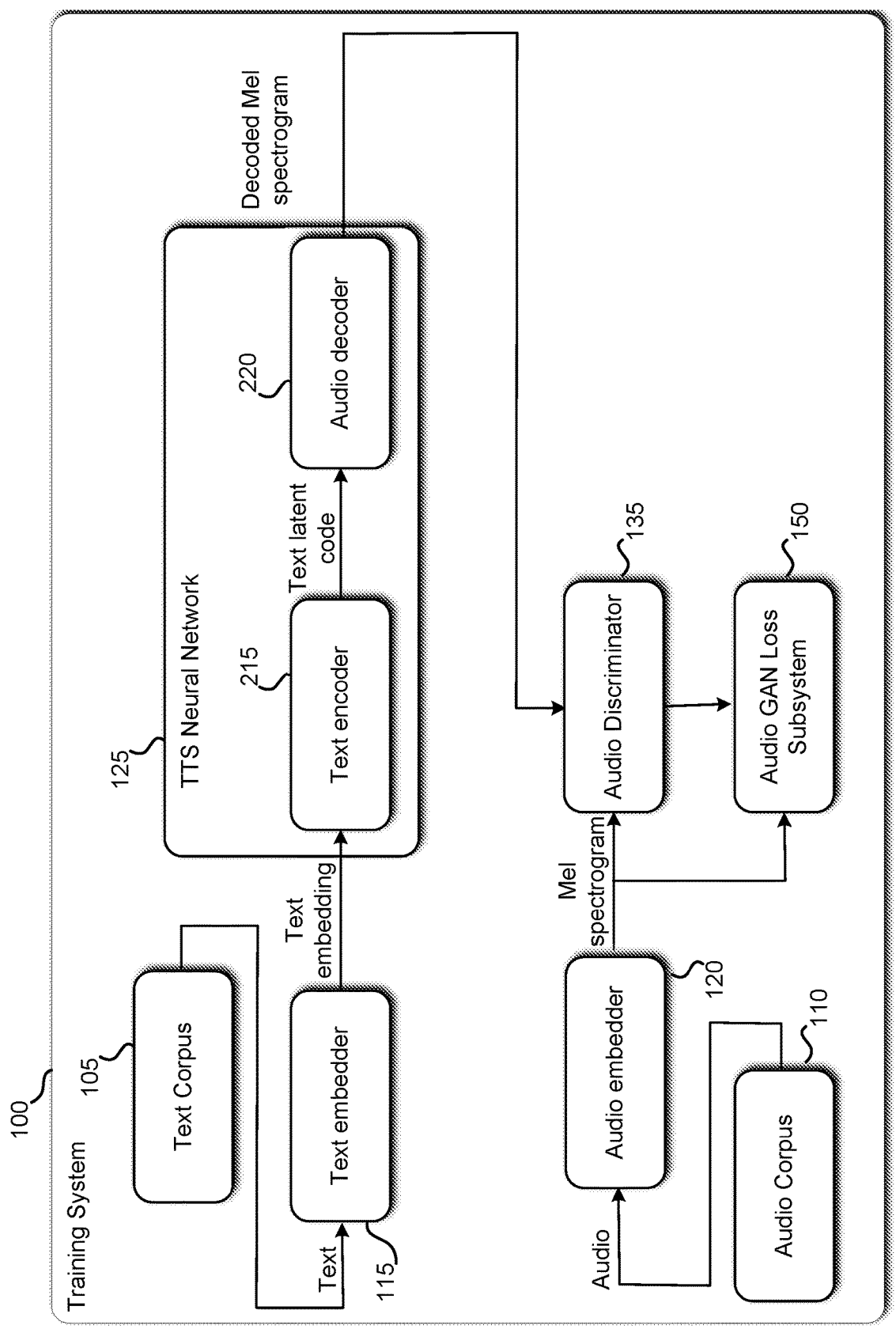
FIG. 7 illustrates the training system during a fourth cycle of training, according to some embodiments.

FIG. 7 illustrates the fourth cycle of the training of the TTS neural network 125 and the ASR neural network 130 in training system 100. In the fourth cycle, a text sample from the text corpus 105 and an audio sample from the audio corpus 110 are selected. The samples need not be related to each other.

The audio sample is provided to the audio embedder 120 to generate a mel spectrogram for input to the audio discriminator 135 and the audio GAN loss subsystem 150.

The text sample from the text corpus 105 is provided to the text embedder 115. The text embedder 115 generates a text embedding and provides the text embedding to the TTS neural network 125. The text encoder 215 generates text latent code representing the text embedding, and the audio decoder 220 generates the decoded mel spectrogram from the text latent code. The decoded mel spectrogram is fed into the audio discriminator 135.

The audio discriminator 135 is trained to output a first value (e.g., "real," "1," or the like) for mel spectrograms that were generated from the audio embedder 120 from an audio source. The audio discriminator 135 is also trained to output a second value (e.g., "fake," "0," or the like) for decoded mel spectrograms generated by the TTS neural network 125. The audio discriminator 135 generates an output value associated with the mel spectrogram from audio embedder 120 and for the decoded mel spectrogram. The output values are provided to the audio GAN loss subsystem 150.

The audio GAN loss subsystem 150 uses the mel spectrogram information from the audio embedder 120 to determine which mel spectrogram is "real" (i.e., from the audio embedder 120) and which is "fake" (i.e., from the TTS neural network 125). The audio GAN loss subsystem 150 can determine whether the audio discriminator 135 made correct determinations. The calculated losses by the audio GAN loss subsystem 150 can be used to train the audio discriminator 135 and the TTS neural network 125.

The first loss for the audio discriminator 135 is used to train the audio discriminator 135. The first loss can be described as:

$$L^{Audio\ Discriminator} = -E_{real}[\log D(X^{real\ audio})] - E_{fake}[\log(1-D(X^{fake\ audio}))]$$

In the equation above, $X^{real\ audio}$ is a sample from an audio source such as an audio sample from the audio corpus 110. $X^{fake\ audio}$ is the output obtained after a text sample (e.g., from text corpus 105) is processed through TTS neural network 125.

The second loss calculated by the audio GAN loss subsystem 150 is used to train the TTS neural network 125. The second loss can be described as:

$$L^{Audio\ Generator} = E_{fake}[\log(1-D(X^{fake\ audio}))]$$

The text discriminator 140 is trained by minimizing $L^{Text\ Discriminator}$ loss function. The loss function is minimized by providing the loss value into the text discriminator 140 and adjusting output parameters of the text discriminator 140 based on the loss value such that the loss function is minimized on future executions of the text discriminator 140. Likewise, the audio discriminator 135 is trained by minimizing the $L^{Audio\ Discriminator}$ loss function. The loss function for the audio discriminator 135 is minimized by providing the loss value into the audio discriminator 135 and adjusting output parameters of the audio discriminator 135 based on the loss value such that the loss function is minimized on future executions of the audio discriminator 135. The text encoder 215, text decoder 320, audio encoder 315, and audio decoder 220 are trained by minimizing the total generative and cycle losses:

$$L^{Total} = L^{cycle1} + L^{cycle2} + L^{Text\ Generator} + L^{Audio\ Generator}$$

The total generative losses and cycle losses are minimized by feeding the loss values back into the respective neural networks and used to adjust output parameters so that future executions of the neural networks minimize the loss value. For example, $L^{cycle1}$ and $L^{cycle2}$ are provided to the TTS neural network 125 (i.e., text encoder 215 and audio decoder 220) and ASR neural network 130 (i.e., audio encoder 315 and text decoder 320) to adjust output parameters of each neural network for minimizing the losses in future executions of the neural networks. $L^{Text\ Generator}$ is also fed back into the ASR neural network 130, and $L^{Audio\ Generator}$ is fed back in to the TTS neural network 125 to adjust output parameters for minimizing the loss.

The GAN losses help in improving the overall generative ability of the text encoder 215, audio encoder 315, text decoder 320, and audio decoder 220. This is because the TTS neural network 125 and ASR neural network 130 must not only produce realistic text embeddings and mel spectrograms but they must also try to fool the respective discriminators as constructed in the loss functions. Thus, we do not rely on only the cycle losses, but also the generative losses ($L^{Text\ Generator}$ and $L^{Audio\ Generator}$) to train the text encoder 215, audio encoder 315, text decoder 320, and audio decoder 220. This improves the overall output quality of both the ASR neural network 130 and TTS neural network 125.

Figure 8:
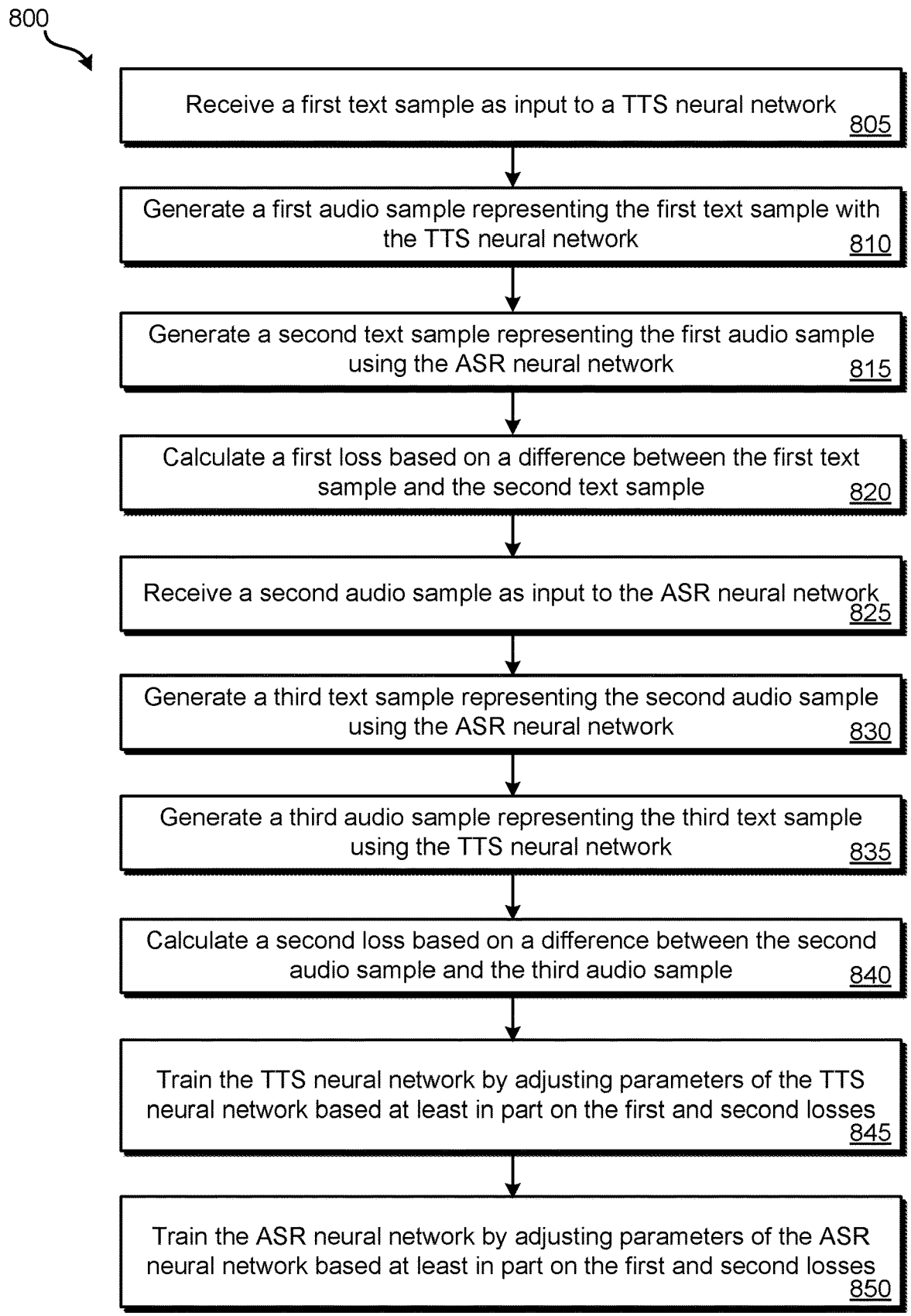
FIG. 8 illustrates a method for adversarially-training ASR and TTS neural networks simultaneously, according to some embodiments.

FIG. 8 illustrates a method 800 for training a TTS neural network and ASR neural network. The method 800 may be performed by a computing system such as training system 100 described with respect to FIG. 1. The method 800 begins at step 805 with the training system receiving a first text sample as input to a TTS neural network. For example, a text sample may be obtained from the text corpus 105. The text embedder 115 may generate a text embedding of the text sample and provide the text embedding to the TTS neural network 125.

At step 810 the TTS neural network may generate a first audio sample representing the first text sample. For example, the TTS neural network 125 may receive the text sample from the text embedder 115. The text encoder 215 of the TTS neural network 125 may generate text latent code from the text embedding, and the audio decoder 220 may generate a decoded mel spectrogram from the text latent code. The decoded mel spectrogram may be the audio sample representing the text sample.

At step 815 the ASR neural network may generate a second text sample representing the first audio sample. For example, the decoded mel spectrogram from the TTS neural network 125 may be provided to the ASR neural network 130. The audio encoder 315 may generate audio latent code from the mel spectrogram, and the text decoder 320 may generate a decoded text embedding from the audio latent code. The decoded text embedding may be the second text sample.

At step 820 the training system may calculate a first loss based on the difference between the first text sample and the second text sample. For example, the text loss cycle 1 subsystem may calculate the first loss based on the difference between the text embedding created by the text embedder 115 from the text sample obtained from the text corpus 105 and the decoded text embedding generated by the ASR neural network 130 from the decoded mel spectrogram generated by the TTS neural network 125 from the original text sample.

At step 825 the training system may receive a second audio sample as input to the ASR neural network. For example, an audio sample may be obtained from the audio corpus 110. The audio embedder 120 may generate a mel spectrogram of the audio sample and provide the mel spectrogram to the ASR neural network 130.

At step 830 the ASR neural network may generate a third text sample representing the second audio sample. For example, the mel spectrogram from the audio embedder 120 may be used by the audio encoder 315 to generate audio latent code. The text decoder 320 may generate a decoded text embedding of the audio latent code. The decoded text embedding may be the third text sample.

At step 835 the TTS neural network may generate a third audio sample representing the third text sample. For example, the decoded text embedding may be fed into the TTS neural network 125. The text encoder 215 may generate text latent code from the decoded text embedding, and the audio decoder 220 may generate a decoded mel spectrogram from the text latent code. The decoded mel spectrogram may be the third audio sample.

At step 840 the training system may calculate a second loss based on the difference between the second audio sample and the third audio sample. For example, the audio loss cycle 2 subsystem 160 may calculate the second loss based on the difference between the mel spectrogram created by the audio embedder 120 from the audio sample obtained from the audio corpus 110 and the decoded mel spectrogram generated by the TTS neural network 125 from the decoded text embedding generated by the ASR neural network 130 from the original audio sample.

At step 845 the training system may train the TTS neural network by adjusting parameters of the TTS neural network based at least in part on the first and second losses. For example, the training system may feed the first and second losses back into the TTS neural network 125. The TTS neural network 125 may adjust parameters of the text encoder 215 and the audio decoder 220 to minimize the loss values from the loss functions on future executions of the TTS neural network 125.

At step 850 the training system may train the ASR neural network by adjusting parameters of the ASR neural network based at least in part on the first and second losses. For example, the training system may feed the first and second losses back into the ASR neural network 130. The ASR neural network 130 may adjust parameters of the audio encoder 315 and the text decoder 320 to minimize the loss values from the loss functions on future executions of the ASR neural network 130.

Examples of Computing Environments for Implementing Certain Embodiments

Figure 9:
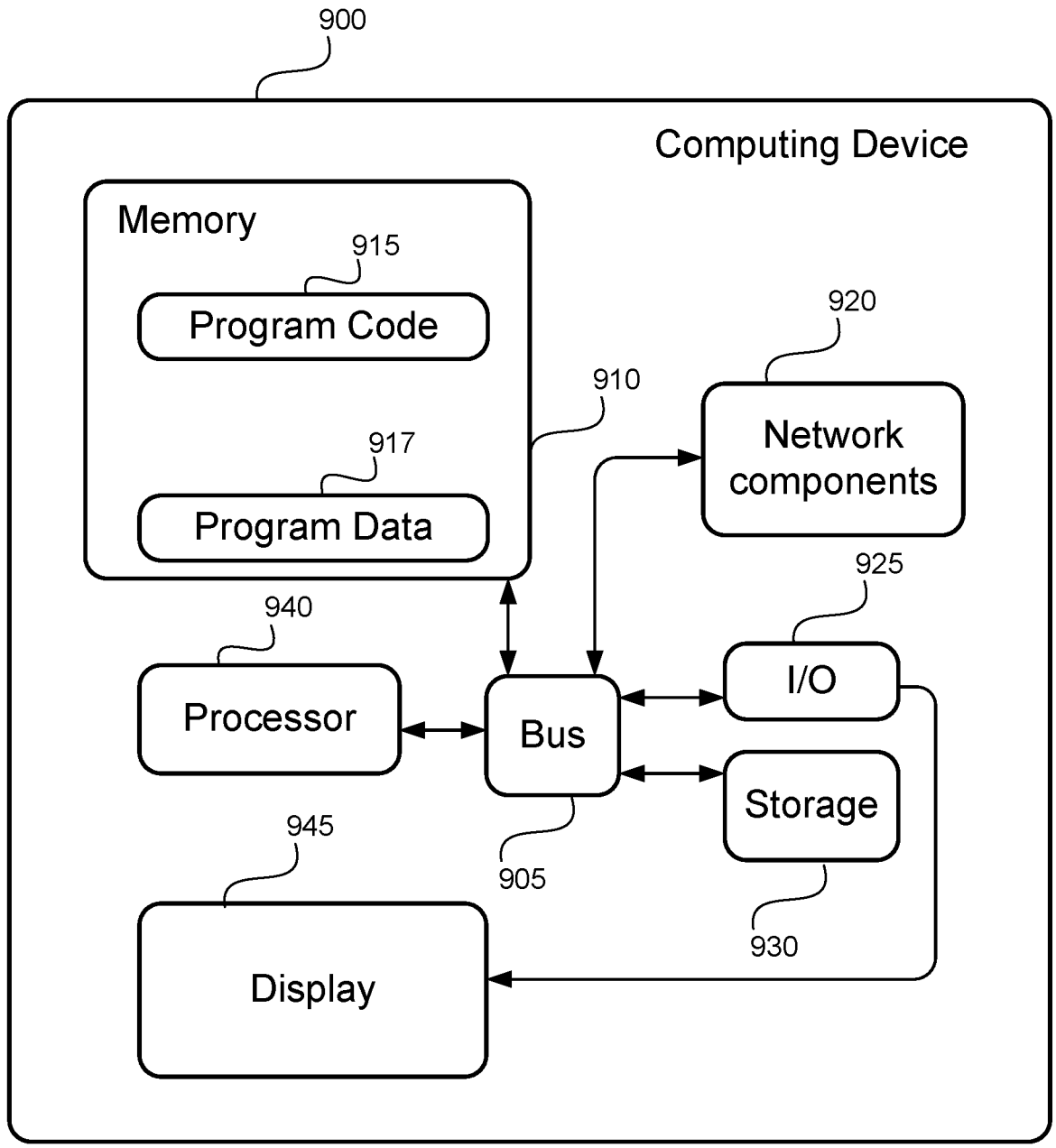
FIG. 9 illustrates a computer system, according to some embodiments.
Figure 10:
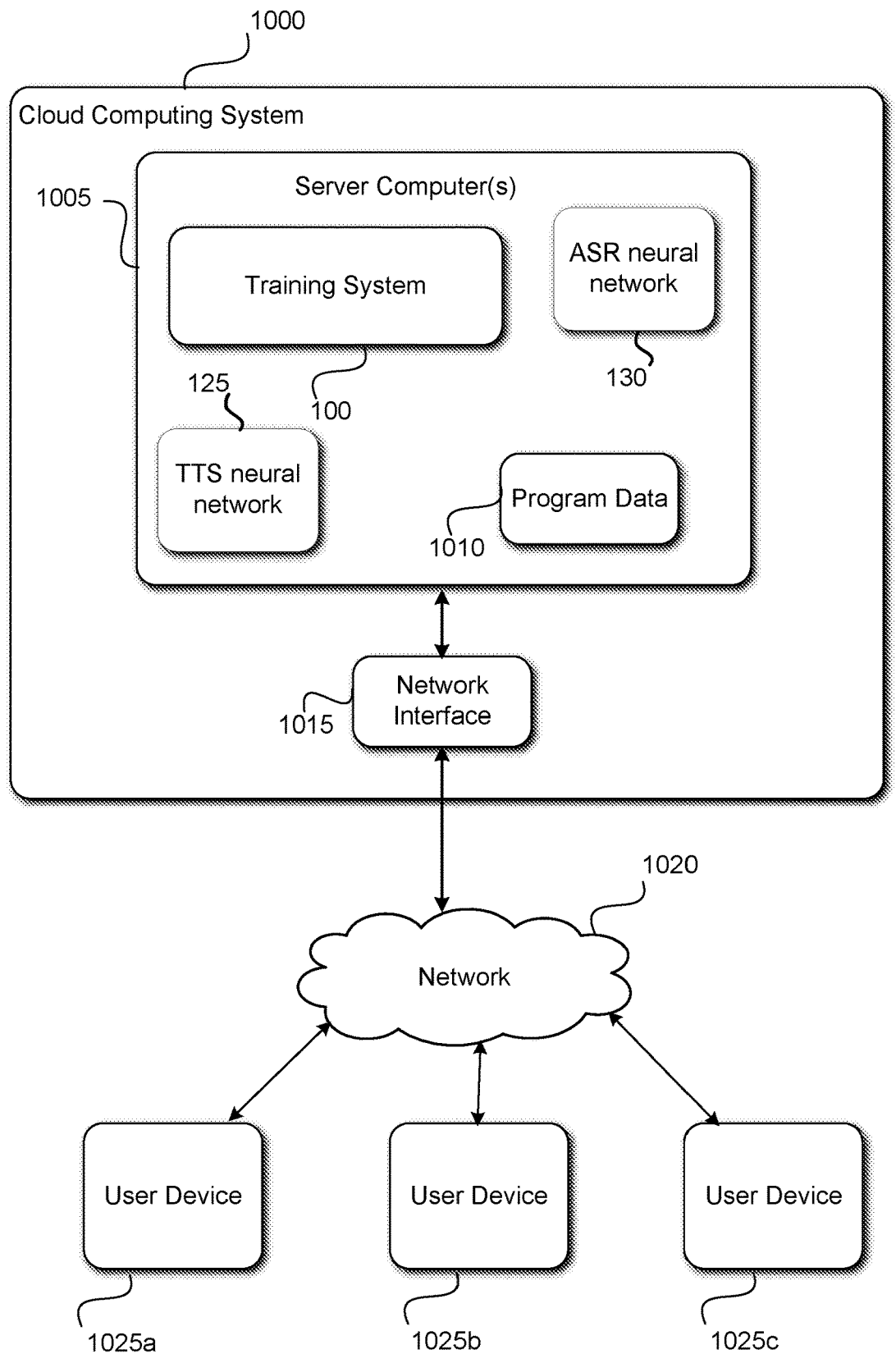
FIG. 10 illustrates a cloud computing system, according to some embodiments.

Any suitable computing system or group of computing systems can be used for performing the operations described herein. For example, FIG. 10 illustrates a cloud computing system 1000 by which at least a portion of the functionality of training system 100 may be offered. FIG. 9 depicts an example of a computing device 900 that may be at least a portion of training system 100. The implementation of the computing device 900 could be used for one or more of the subsystems depicted in FIG. 1. In an embodiment, a single training system 100 having devices similar to those depicted in FIG. 9 (e.g., a processor, a memory, etc.) combines the one or more operations and data stores depicted as separate subsystems in FIG. 1.

FIG. 9 illustrates a block diagram of an example of a computer system 900. Computer system 900 can be any of the described computers herein including, for example, training system 100, user device 200, user device 300, and the like. The computing device 900 can be or include, for example, an integrated computer, a laptop computer, desktop computer, tablet, server, a smartphone, or other electronic device.

The computing device 900 can include a processor 940 interfaced with other hardware via a bus 905. A memory 910, which can include any suitable tangible (and non-transitory) computer readable medium, such as RAM, ROM, EEPROM, or the like, can embody program components (e.g., program code 915) that configure operation of the computing device 900. Memory 910 can store the program code 915, program data 917, or both. In some examples, the computing device 900 can include input/output ("I/O") interface components 925 (e.g., for interfacing with a display 945, keyboard, mouse, and the like) and additional storage 930.

The computing device 900 executes program code 915 that configures the processor 940 to perform one or more of the operations described herein. Examples of the program code 915 include, in various embodiments, text embedder 115, TTS neural network 125, audio discriminator 135, audio embedder 120, ASR neural network 130, text discriminator 140, text loss cycle 1 subsystem 145, audio GAN loss subsystem 150, Text GAN loss subsystem 155, audio loss cycle 2 subsystem 160, or any other suitable systems or subsystems that perform one or more operations described herein (e.g., one or more development systems for configuring an interactive user interface). The program code 915 may be resident in the memory 910 or any suitable computer-readable medium and may be executed by the processor 940 or any other suitable processor.

The computing device 900 may generate or receive program data 917 by virtue of executing the program code 915. For example, text samples, audio samples, the data in text corpus 105, the data in audio corpus 110, and so forth are all examples of program data 917 that may be used by the computing device 900 during execution of the program code 915.

The computing device 900 can include network components 920. Network components 920 can represent one or more of any components that facilitate a network connection. In some examples, the network components 920 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 920 can be wired and can include interfaces such as Ethernet, USB, or IEEE 1394.

Although FIG. 9 depicts a single computing device 900 with a single processor 940, the system can include any number of computing devices 900 and any number of processors 940. For example, multiple computing devices 900 or multiple processors 940 can be distributed over a wired or wireless network (e.g., a Wide Area Network, Local Area Network, or the Internet). The multiple computing devices 900 or multiple processors 940 can perform any of the steps of the present disclosure individually or in coordination with one another.

In some embodiments, the functionality provided by the training system 100 may be offered as cloud services by a cloud service provider. For example, FIG. 10 depicts an example of a cloud computing system 1000 offering a training service that can be used by a number of user subscribers using user devices 1025a, 1025b, and 1025c across a data network 1020. User devices 1025a, 1025b, and 1025c could be examples of a vehicle 105 described above. In the example, the training service or the trained TTS or ASR neural networks may be offered under a Software as a Service (SaaS) model. One or more users may subscribe to the training service, the trained ASR neural network, and/or the TTS neural network, and the cloud computing system performs the processing to provide the training service, ASR service, and/or TTS service to subscribers. The cloud computing system may include one or more remote server computers 1005.

The remote server computers 1005 include any suitable non-transitory computer-readable medium for storing program code (e.g., training system 100) and program data 1010, or both, which is used by the cloud computing system 1000 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 1005 can include volatile memory, non-volatile memory, or a combination thereof.

One or more of the servers 1005 execute the program code 1010 that configures one or more processors of the server computers 1005 to perform one or more of the operations that provide training services, ASR services, and/or TTS services. As depicted in the embodiment in FIG. 10, the one or more servers 1005 provide the services via the training system 100, ASR neural network 130, and/or TTS neural network 125. Any other suitable systems or subsystems that perform one or more operations described herein (e.g., one or more development systems for configuring an interactive user interface) can also be implemented by the cloud computing system 1000.

In certain embodiments, the cloud computing system 1000 may implement the services by executing program code and/or using program data 1010, which may be resident in a memory device of the server computers 1005 or any suitable computer-readable medium and may be executed by the processors of the server computers 1005 or any other suitable processor.

In some embodiments, the program data 1010 includes one or more datasets and models described herein. Examples of these datasets include the text corpus 105 and the audio corpus 110, and so forth. In some embodiments, one or more of data sets, models, and functions are stored in the same memory device. In additional or alternative embodiments, one or more of the programs, data sets, models, and functions described herein are stored in different memory devices accessible via the data network 1015.

The cloud computing system 1000 also includes a network interface device 1015 that enable communications to and from cloud computing system 1000. In certain embodiments, the network interface device 1015 includes any device or group of devices suitable for establishing a wired or wireless data connection to the data networks 1020. Non-limiting examples of the network interface device 1015 include an Ethernet network adapter, a modem, and/or the like. The training system 100 is able to communicate with the user devices 1025a, 1025b, and 1025c via the data network 1020 using the network interface device 1015.

GENERAL CONSIDERATIONS

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. A method for training a text-to-speech (TTS) neural network and an automatic speech recognition (ASR) neural network, the method comprising:
   receiving a first text sample as input to the TTS neural network;
   generating, using the TTS neural network, a first audio sample representing the first text sample;
   generating, using the ASR neural network, a second text sample representing the first audio sample that represents the first text sample;
   calculating a first loss based on a first difference between the first text sample and the second text sample;
   receiving a second audio sample as input to the ASR neural network;
   generating, using the ASR neural network, a third text sample representing the second audio sample;

generating, using the TTS neural network, a third audio sample representing the third text sample that represents the second audio sample;
calculating a second loss based on a second difference between the second audio sample and the third audio sample, wherein the first loss and the second loss form cycle losses;
generating, using the ASR neural network, a fourth text sample representing a fourth audio sample received as input to the ASR neural network;
receiving, as input to a text discriminator, the fourth text sample and a fifth text sample from a textual source;
generating, by the text discriminator, a third loss based on the fourth text sample and the fifth text sample;
generating, using the TTS neural network, a fifth audio sample representing the fifth text sample received as input to the TTS neural network;
receiving, as input to an audio discriminator, the fifth audio sample and a sixth audio sample from an audio source;
generating, by the audio discriminator, a fourth loss based on the fifth audio sample and the sixth audio sample, wherein the third loss and the fourth loss form generative losses;
jointly training the TTS neural network and the ASR neural network using the cycle losses and the generative losses by:
training the TTS neural network by adjusting parameters of the TTS neural network based at least in part on the cycle losses and the generative losses by feeding back the first loss and the fourth loss to the TTS neural network; and
training the ASR neural network by adjusting parameters of the ASR neural network based at least in part on the cycle losses and the generative losses by feeding back the second loss and the third loss to the ASR neural network.

2. The method of claim 1, wherein the TTS neural network comprises a text encoder and an audio decoder, and wherein training the TTS neural network comprises adjusting one or more parameters of the text encoder or one or more parameters of the audio decoder based on at least the generative losses.

3. The method of claim 1, wherein the ASR neural network comprises an audio encoder and a text decoder, and wherein training the ASR neural network comprises adjusting one or more parameters of the audio encoder or one or more parameters of the text decoder based on at least the generative losses.

4. The method of claim 1, wherein the text discriminator is trained to output a first value for a fake text sample, wherein the fake text sample is generated from an audio sample, and wherein the text discriminator is trained to output a second value for a real text sample, wherein the real text sample is generated from a textual source.

5. The method of claim 1, wherein the audio discriminator is trained to output a first value for a fake audio sample, wherein the fake audio sample is generated from a text sample, and wherein the audio discriminator is trained to output a second value for a real audio sample, wherein the real audio sample is generated from an audio source.

6. The method of claim 1, further comprising:
deploying the trained TTS neural network.

7. The method of claim 1, further comprising:
deploying the trained ASR neural network.

8. A system, comprising:
a text-to-speech (TTS) neural network;
an automatic speech recognition (ASR) neural network;
a text discriminator;
an audio discriminator;
one or more processors; and
a memory having stored thereon instructions that, upon execution by the one or more processors, cause the one or more processors to:
provide a first text sample as input to the TTS neural network;
receive, from the TTS neural network, a first audio sample representing the first text sample;
provide the first audio sample as input to the ASR neural network;
receive, from the ASR neural network, a second text sample representing the first audio sample that represents the first text sample;
calculate a first loss based on a first difference between the first text sample and the second text sample;
provide a second audio sample as input to the ASR neural network;
receive, from the ASR neural network, a third text sample representing the second audio sample;
provide the third text sample as input to the TTS neural network;
receive, from the TTS neural network, a third audio sample representing the third text sample that represents the second audio sample;
calculate a second loss based on a second difference between the second audio sample and the third audio sample, wherein the first loss and the second loss form cycle losses;
generate, using the ASR neural network, a fourth text sample representing a fourth audio sample received as input to the ASR neural network;
receive, as input to the text discriminator, the fourth text sample and a fifth text sample from a textual source;
generate, using the text discriminator, a third loss based on the fourth text sample and the fifth text sample;
generate, using the TTS neural network, a fifth audio sample representing the fifth text sample received as input to the TTS neural network;
receive, as input to the audio discriminator, the fifth audio sample and a sixth audio sample from an audio source;
generate, using the audio discriminator, a fourth loss based on the fifth audio sample and the sixth audio sample, wherein the third loss and the fourth loss form generative losses;
jointly train the TTS neural network and the ASR neural network using the cycle losses and the generative losses by:
training the TTS neural network by adjusting parameters of the TTS neural network based at least in part on the cycle losses and the generative losses by feeding back the first loss and the fourth loss to the TTS neural network; and
training the ASR neural network by adjusting parameters of the ASR neural network based at least in part on the cycle losses and the generative losses by feeding back the second loss and the third loss to the ASR neural network.

9. The system of claim 8, wherein the TTS neural network comprises a text encoder and an audio decoder, and wherein the instructions for training the TTS neural network comprises instructions that, upon execution by the one or more processors, cause the one or more processors to adjust one or more parameters of the text encoder or one or more parameters of the audio decoder based on at least the generative losses.

10. The system of claim 8, wherein the ASR neural network comprises an audio encoder and a text decoder, and wherein the instructions for training the ASR neural network comprises instructions that, upon execution by the one or more processors, cause the one or more processors to adjust one or more parameters of the audio encoder or one or more parameters of the text decoder based on at least the generative losses.

11. The system of claim 8, wherein the text discriminator is trained to output a first value for a fake text sample, wherein the fake text sample is generated from an audio sample, and wherein the text discriminator is trained to output a second value for a real text sample, wherein the real text sample is generated from a textual source.

12. The system of claim 8, wherein the audio discriminator is trained to output a first value for a fake audio sample, wherein the fake audio sample is generated from a text sample, and wherein the audio discriminator is trained to output a second value for a real audio sample, wherein the real audio sample is generated from an audio source.

13. The system of claim 8, wherein the trained TTS neural network and the trained ASR neural network are deployed independently.

14. The system of claim 8, wherein the trained TTS neural network and the trained ASR neural network are deployed for use on a single device.

* * * * *